(12) United States Patent
Clark

(10) Patent No.: US 8,844,657 B2
(45) Date of Patent: Sep. 30, 2014

(54) STAND ON MOWER WITH TRACTION DRIVE PEDALS

(71) Applicant: Deere & Company, Moline, IL (US)

(72) Inventor: Richard Hugo Clark, Holly Springs, NC (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/770,088

(22) Filed: Feb. 19, 2013

(65) Prior Publication Data

US 2014/0231155 A1   Aug. 21, 2014

(51) Int. Cl.
*B60K 17/34* (2006.01)
*B62D 11/04* (2006.01)
*A01D 34/00* (2006.01)

(52) U.S. Cl.
CPC .............. *B62D 11/04* (2013.01); *A01D 34/00* (2013.01)
USPC ........... 180/6.32; 180/6.48; 180/6.4; 180/6.3; 180/315; 74/512; 74/513

(58) Field of Classification Search
USPC ............ 180/6.32, 6.48, 6.4, 6.3, 315; 74/512, 74/513
See application file for complete search history.

(56) References Cited

U.S. PATENT DOCUMENTS

| | | | | |
|---|---|---|---|---|
| 4,716,980 A * | 1/1988 | Butler | | 180/19.2 |
| 5,507,138 A | 4/1996 | Wright et al. | | |
| 6,019,016 A * | 2/2000 | Takagi et al. | | 74/513 |
| 6,601,663 B2 * | 8/2003 | Hauser | | 180/6.3 |
| 6,845,829 B2 * | 1/2005 | Hafendorfer | | 180/6.48 |
| 7,086,491 B2 * | 8/2006 | Matte | | 180/65.1 |
| 7,942,224 B2 * | 5/2011 | Marshall et al. | | 180/89.13 |
| 2003/0213626 A1 * | 11/2003 | Hafendorfer | | 180/6.48 |

* cited by examiner

*Primary Examiner* — Joseph M Rocca
*Assistant Examiner* — Marlon Arce

(57) ABSTRACT

A stand on mower includes a left foot pedal and a right foot pedal. Each foot pedal is spaced from the other and is dimensioned to support one of the operator's feet. Each foot pedal is biased to a neutral position generally parallel to a horizontal surface of a foot platform located generally between or behind a pair of traction drive wheels. The left foot pedal and the right foot pedal pivot independently forwardly and rearwardly to forward and reverse traction drive positions, and are connected to a pair of wheel motors respectively that rotate each of the traction drive wheels in either forward or reverse based on the traction drive positions of the foot pedals.

11 Claims, 3 Drawing Sheets

STAND ON MOWER WITH TRACTION DRIVE PEDALS

FIELD OF THE INVENTION

This invention relates to stand on mowers, and more specifically to a stand on mower with traction drive pedals.

BACKGROUND OF THE INVENTION

Stand on mowers are self propelled power mowing machines with dual traction drive systems that propel drive wheels on the left and right sides of the machines, foot platforms on which operators stand between, or slightly forward or behind, the drive wheels, and hand operated controls in front of the operator. The hand operated controls include traction speed and direction control levers that operators use to control the dual traction drive systems. Stand on mowers have mowing decks with a plurality of rotary cutting blades designed and used to mow grass effectively and efficiently. An example of a stand on mower is shown in U.S. Pat. No. 5,507,138.

Stand on mowers may include stationary bars in front of the operator adjacent the traction speed and direction control levers. Operators may grip the stationary bars with their hands to help stabilize themselves while standing on the foot platform. However, operators may have difficulty operating the traction speed and direction control levers while holding onto the stationary bars, especially while the machine travels over uneven terrain. Operators also may release the stationary bars to actuate other controls, such as push button controls to raise and lower the mowing deck, or to shut off the mowing deck. These actions may result in a temporary loss of operator stability.

A stand on mower is needed having traction speed and direction controls that operators may use without removing their hands from the stationary bars. A stand on mower is needed that increases operator stability.

SUMMARY OF THE INVENTION

A stand on mower with traction drive pedals pivotably mounted between a pair of traction drive wheels. Each foot pedal is dimensioned to support one of an operator's feet in a standing position. Each foot pedal pivots between a forward position and a reverse position, and is connected to a motor that rotates one of the traction drive wheels at a desired speed in forward or reverse corresponding to the foot pedal position. The stand on mower with traction drive pedals may be used to control traction speed and direction without removing hands from stationary bars. The stand on mower with traction drive pedals increases operator stability.

DESCRIPTION OF THE PREFERRED EMBODIMENT

Figure 1:
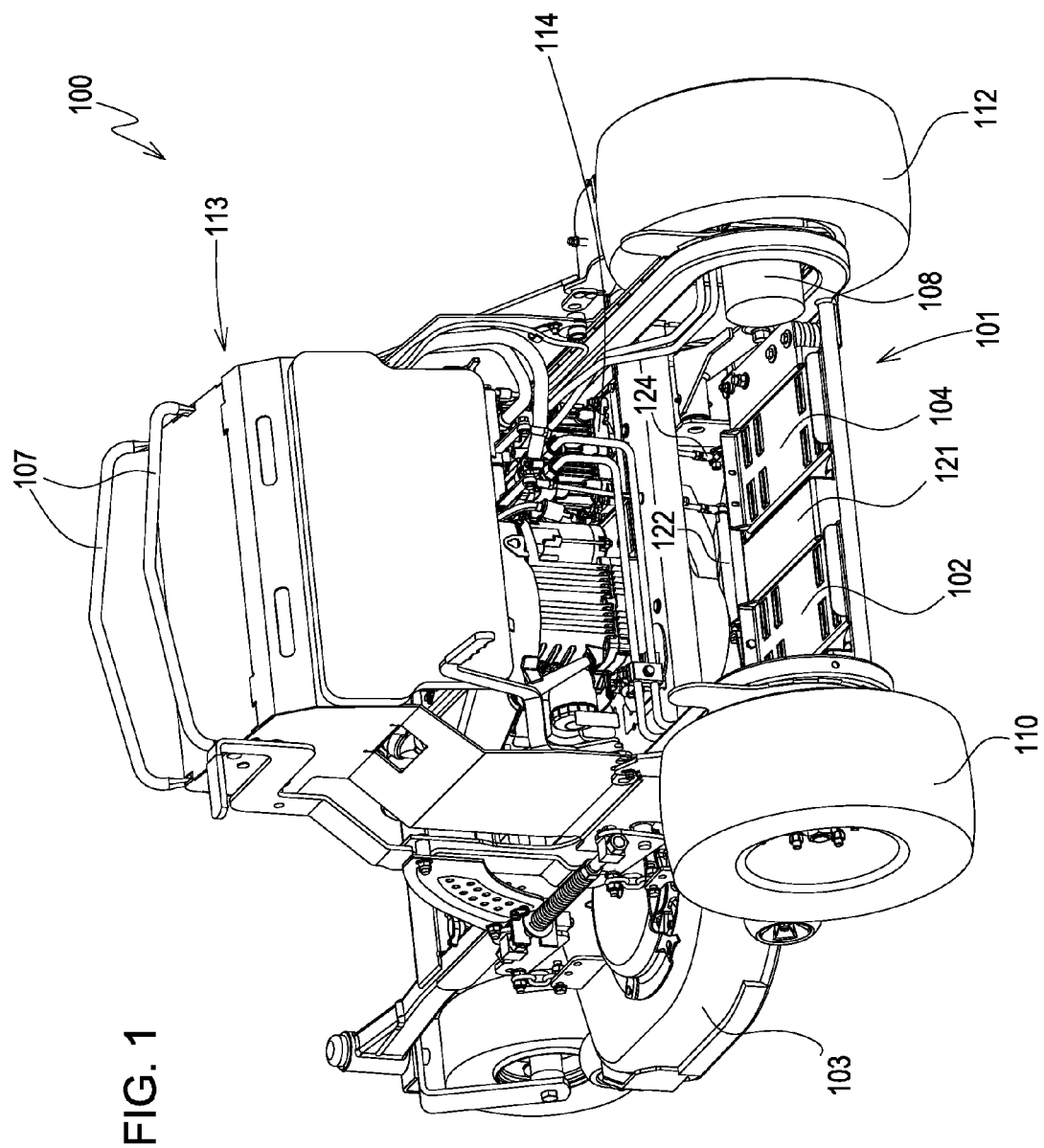
FIG. 1 is a rear perspective view of a stand on mower with traction drive pedals according to a first embodiment of the invention.
Figure 2:
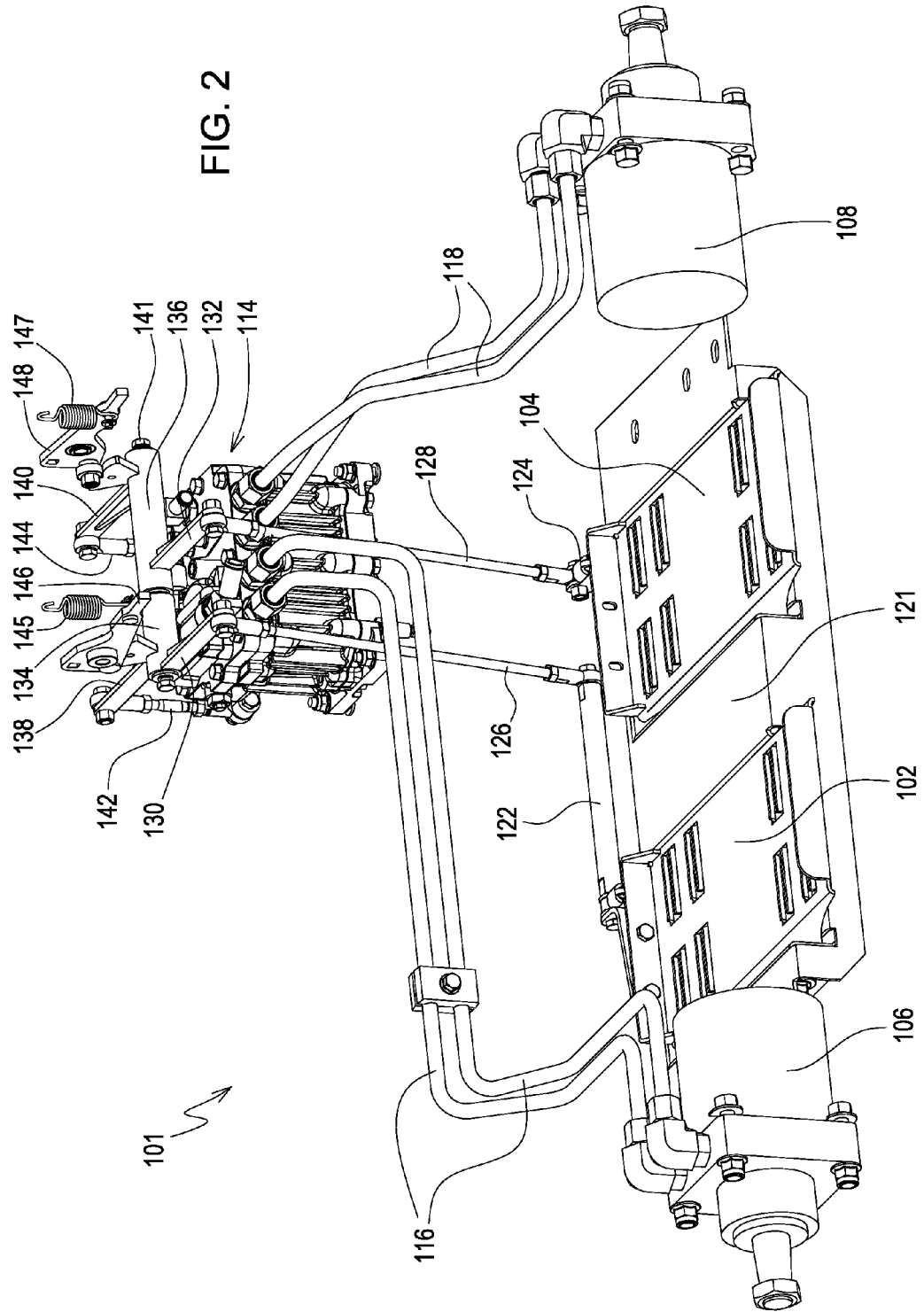
FIG. 2 is a rear perspective view of traction drive pedals for a stand on mower according to a first embodiment of the invention.
Figure 3:
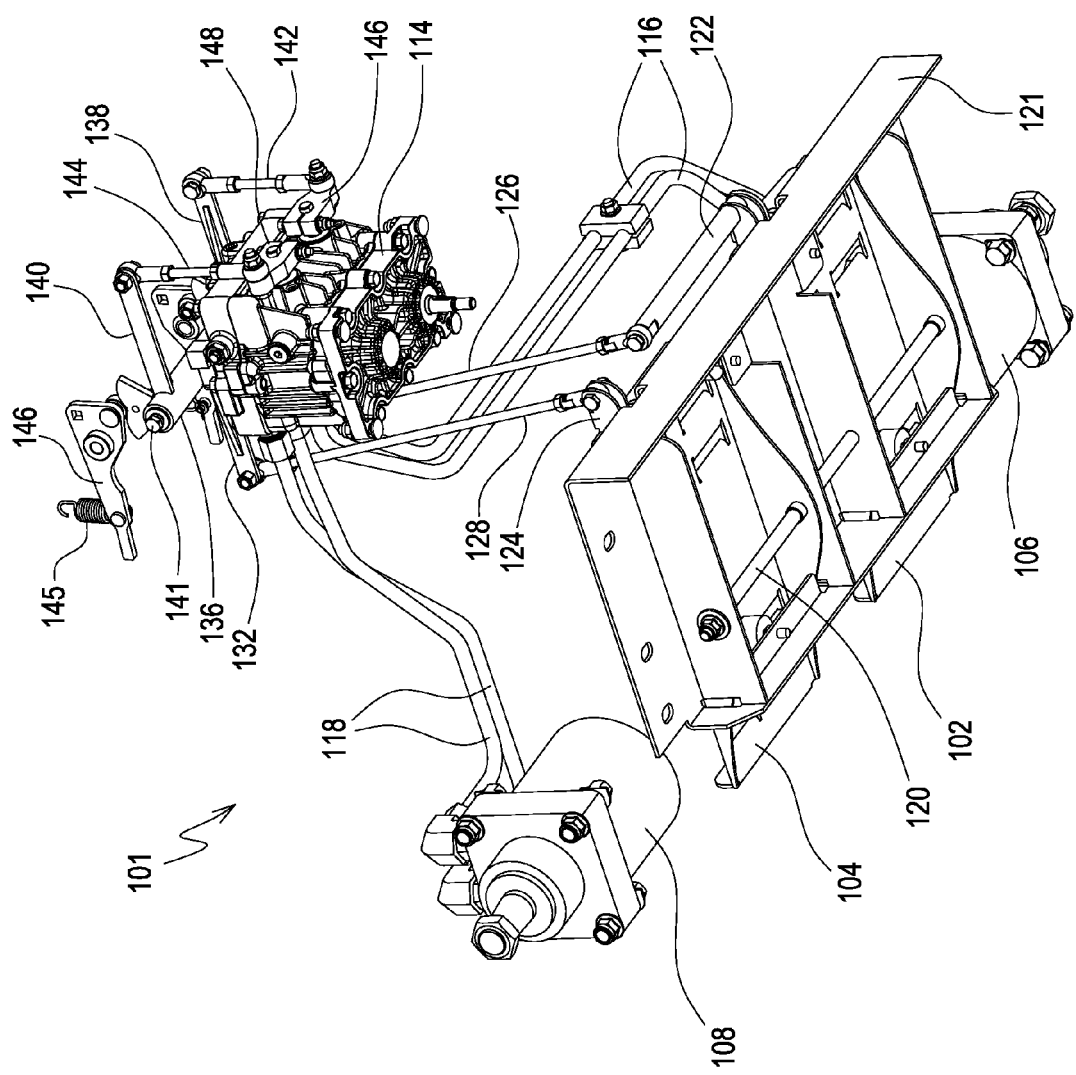
FIG. 3 is a front bottom perspective view of traction drive pedals on a stand on mower according to a first embodiment of the invention.

In one embodiment shown in FIGS. 1-3, stand on mower 100 may be provided with traction drive pedals 101 including left foot pedal 102 and right foot pedal 104 at or adjacent the rear of the machine. The left foot pedal and right foot pedal may be spaced from each other, and each pedal may be dimensioned to support one of the operator's feet. Each foot pedal may be mounted to the stand on mower between traction drive wheels 110, 112, and each pedal may be biased to a neutral or base position that may be generally parallel and coplanar to the horizontal surface or plane of foot platform 121 that is located generally between or behind traction drive wheels 110, 112. The foot platform also may include sufficient area for one or both of an operator's feet if the operator steps off the foot pedals.

In one embodiment, each foot pedal may be connected directly or indirectly to a wheel motor that rotates a traction drive wheel at a forward or reverse speed corresponding to the pedal position. Each wheel motor may be hydraulic or electric. Each foot pedal may pivot or rock independently forwardly and rearwardly to forward and reverse traction drive positions respectively. For example, each foot pedal may be independently mounted to rocker bar 120 extending transversely across the rear of the stand on mower below foot platform 121. Additionally, the stand on mower may include an interlock switch that may need to be actuated before either wheel motor rotates a traction drive wheel in response to the position of a traction drive pedal.

In one embodiment, each foot pedal may be connected to one side of variable displacement dual hydraulic pump 114. Each side of the pump may provide hydraulic fluid to one of hydraulic motors 106, 108 to rotate one of traction drive wheels 110, 112 at a desired speed. The left side of the variable displacement hydrostatic pump and right side of the variable displacement hydrostatic pump may provide pressurized hydraulic fluid through conduits to the left hydrostatic motor and the right hydrostatic motor respectively so that the motors may rotate each the machine's rear drive wheels in either forward or reverse. The foot pedals operate independently of each other, so that one of the foot pedals may be in a forward drive position and the other may be in a reverse drive position.

In one embodiment, mowing deck 103 may be mounted forwardly of the traction drive wheels. Additionally, one or more stationary bars 107 may be positioned in front of the operator on operator station 113 positioned forwardly of the rear drive wheels. The stationary bar(s) 107 may be mounted to the top of the operator station, and may extend substantially across the width of the operator station so that an operator may grip the stationary bar with both hands while in a standing position on the foot pedals.

In one embodiment, mechanical linkages may connect each foot pedal 102, 104 to one of swash plate controls 146, 148 on each side of hydraulic pump 114. For example, in the embodiment shown in FIGS. 1-3, left pedal arm 122 may connect to a forward end of left foot pedal 102. Left connection rod 126 may pivotably connect left pedal arm 122 to left crank arm 130. Left crank arm 130 may extend radially and rearwardly from left sleeve 134 pivotably mounted on rod pivot axis 141. Left crank arm 138 may extend radially and forwardly from left sleeve 134. Left connection rod 142 may pivotably connect left crank arm 138 to left swash plate control 146. Hydraulic hoses 116 connect the left side of pump 114 to left wheel motor 106.

Similarly, in the embodiment of FIGS. 1-3, right pedal arm 124 may connect to a forward end of right foot pedal 104. Right connection rod 128 may pivotably connect right pedal arm 124 to right crank arm 132. Right crank arm 132 may extend radially and rearwardly from right sleeve 136 pivotably mounted on rod pivot axis 141. Right crank arm 140 may extend radially and forwardly from right sleeve 136. Right connection rod 144 may pivotably connect right crank arm 140 to right swash plate control 148. Hydraulic hoses 118 connect the right side of pump 114 to right wheel motor 108.

In an alternative embodiment, each foot pedal may provide electronic signals to the swash plate controls of the variable displacement dual hydraulic pump, instead of mechanical linkages.

In another alternative embodiment, instead of a variable displacement dual hydraulic pump and hydraulic motors, the stand on mower may include electric motors for each traction drive wheel, and each foot pedal may be electrically connected to each motor and provide electronic signals to command the speed and direction of each electric motor.

In one embodiment, left and right biasing springs 145, 147 may be connected to left and right biasing arms 146, 148 that may urge each of left foot pedal 102 and right foot pedal 104 to their neutral positions. The operator may exert pressure on each foot control to rock or pivot the control forwardly in a first direction or rearwardly in a second direction.

In one embodiment, each foot pedal may be moved or pivoted from the neutral position to a forward drive position by depressing the forward portion of the pedal with the front of the operator's foot or toes. Each foot pedal may be moved or pivoted between a minimum and a maximum forward drive speed position. For example, each foot pedal may move a swash plate control to a forward drive position, causing the variable displacement hydrostatic pump to supply hydraulic fluid to one of the left and right hydrostatic motors sufficient to rotate a traction drive wheel at a forward speed corresponding to the foot pedal position. Alternatively, each foot pedal may move a potentiometer or other electronic control to a forward drive position, causing an electric wheel motor to rotate a traction drive wheel at a forward speed corresponding to the foot pedal position.

In one embodiment, each foot pedal also may be moved or pivoted from the neutral position to a reverse drive position by depressing the rear portion of the pedal with the back of the operator's foot or heel. Each foot pedal may be pivoted between a minimum and a maximum reverse drive speed position. For example, each foot pedal may move a swash plate control to a reverse drive position, causing the variable displacement hydrostatic pump to supply hydraulic fluid to one of the left and right hydrostatic motors sufficient to rotate a traction drive wheel at a reverse speed corresponding to the foot pedal position. Alternatively, each foot pedal may move a potentiometer or other electronic control to a reverse drive position, causing an electric wheel motor to rotate a traction drive wheel at a reverse speed corresponding to the foot pedal position.

Having described the preferred embodiment, it will become apparent that various modifications can be made without departing from the scope of the invention as defined in the accompanying claims.

The invention claimed is:

1. A stand on mower comprising:
    a left foot pedal and a right foot pedal, each foot pedal spaced from the other and dimensioned to support one of the operator's feet while in a standing position at the rear of the mower; each foot pedal biased to a neutral position generally parallel to a horizontal surface of a foot platform located generally between or behind a pair of traction drive wheels;
    the left foot pedal and the right foot pedal pivoting independently forwardly and rearwardly to forward and reverse traction drive positions and being connected to a left wheel motor and a right wheel motor that rotate each of the traction drive wheels in either forward or reverse based on the traction drive positions of the foot pedals;
    wherein the left foot pedal and the right foot pedal are connected to a left side and a right side of a variable displacement dual hydraulic pump providing hydraulic fluid to a left hydrostatic motor and a right hydrostatic motor respectively for rotating the traction drive wheels.

2. The stand on mower of claim 1 further comprising mechanical linkages connecting each foot pedal to a swash plate control on one of the sides of the variable displacement dual hydraulic pump.

3. A stand on mower comprising:
    a left foot pedal and a right foot pedal, each foot pedal spaced from the other and dimensioned to support one of the operator's feet; each foot pedal biased to a neutral position generally parallel to a horizontal surface of a foot platform located generally between or behind a pair of traction drive wheels;
    the left foot pedal and the right foot pedal pivoting independently forwardly and rearwardly to forward and reverse traction drive positions and being connected to a left wheel motor and a right wheel motor that rotate each of the traction drive wheels in either forward or reverse based on the traction drive positions of the foot pedals;
    wherein each foot pedal is independently mounted to a rocker bar extending transversely across the rear of the stand on mower.

4. A stand on mower comprising:
    a left foot pedal and a right foot pedal, each foot pedal spaced from the other and dimensioned to support one of the operator's feet while in a standing position at the rear of the mower; each foot pedal biased to a neutral position generally parallel to a horizontal surface of a foot platform located generally between or behind a pair of traction drive wheels;
    the left foot pedal and the right foot pedal pivoting independently forwardly and rearwardly to forward and reverse traction drive positions and being connected to a left wheel motor and a right wheel motor that rotate each of the traction drive wheels in either forward or reverse based on the traction drive positions of the foot pedals;
    a stationary bar mounted to the top of an operator station on the stand on mower and extending substantially across the width of the operator station so that the stationary bar may be gripped while in a standing position.

5. A stand on mower comprising:
    a pair of foot pedals that are independently moveable between a neutral position and a forward drive position by depressing a forward portion of the pedal between a minimum and a maximum forward drive speed position; and between a neutral position and a reverse drive position by depressing a rear portion of the pedal between a minimum and a maximum reverse drive speed position;
    each foot pedal mounted to a rocker bar across a rear portion of the stand on mower between a pair of rear traction drive wheels and connected to a traction drive motor to rotate one of the rear traction drive wheels at a speed corresponding to the foot pedal position;
    a mechanical linkage between each foot pedal and a swash plate control on a variable displacement hydrostatic pump to supply hydraulic fluid to a hydrostatic traction drive motor.

6. The stand on mower of claim 5 further comprising biasing springs urging each foot pedal to the neutral position.

7. The stand on mower of claim 5 wherein each foot pedal in the neutral position is generally coplanar with an operator platform between the rear traction drive wheels.

8. A stand on mower comprising:

a pair of foot pedals that are independently moveable between a neutral position and a forward drive position by depressing a forward portion of the pedal between a minimum and a maximum forward drive speed position; and between a neutral position and a reverse drive position by depressing a rear portion of the pedal between a minimum and a maximum reverse drive speed position;

each foot pedal mounted on a rear portion of the stand on mower between a pair of rear traction drive wheels and connected to a traction drive motor to rotate one of the rear traction drive wheels at a speed corresponding to the foot pedal position;

a mechanical linkage between each foot pedal and a swash plate control on a variable displacement hydrostatic pump to supply hydraulic fluid to a hydrostatic traction drive motor;

wherein the mechanical linkage includes a sleeve and crank arm pivoting on a shaft.

9. A stand on mower comprising:

a pair of foot pedals pivotably mounted between a pair of traction drive wheels; each foot pedal dimensioned to support one of an operator's feet in a standing position at the rear of the mower; each foot pedal pivoting between a forward position and a reverse position; each foot pedal connected to a motor that rotates one of the traction drive wheels at a desired speed in forward or reverse based on the foot pedal position;

a linkage from each foot pedal to a variable displacement dual hydraulic pump; each side of the pump providing pressurized hydraulic fluid to one of a pair of hydraulic wheel motors.

10. A stand on mower comprising:

a pair of foot pedals pivotably mounted between a pair of traction drive wheels; each foot pedal dimensioned to support one of an operator's feet in a standing position at the rear of the mower; each foot pedal pivoting between a forward position and a reverse position; each foot pedal connected to a motor that rotates one of the traction drive wheels at a desired speed in forward or reverse based on the foot pedal position;

a foot platform on a generally horizontal plane between the pair of traction drive wheels, and wherein each foot pedal is on the same plane as the foot platform in the neutral position.

11. The stand on mower of claim 10 wherein a portion of the foot platform is between the pair of foot pedals.

* * * * *